United States Patent Office 3,720,670

Patented Mar. 13, 1973

3,720,670
BENZODIOXANE DERIVATIVES

Michio Nakanishi, Oita, Katsuo Arimura, Fukuoka, and Yoshiaki Tsuda, Oita, Japan, assignors to Yoshitomi Pharmaceutical Industries, Ltd., Osaka, Japan No Drawing. Filed Mar. 1, 1971, Ser. No. 119,916
Claims priority, application Japan, Feb. 27, 1970, 45/17,513; Dec. 24, 1970, 45/126,832, 45/126,833, 45/126,834
Int. Cl. C07d *87/08*
U.S. Cl. 260—244 R 9 Claims

ABSTRACT OF THE DISCLOSURE

Benzodioxane derivatives of the formula:

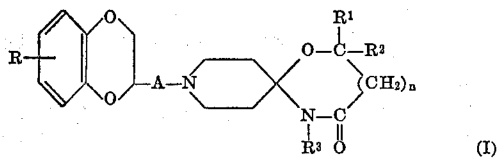

wherein R is a member selected from the group consisting of H, halogen, a lower alkyl group of 1 to 4 carbon atoms and a lower alkoxy group of 1 to 4 carbon atoms, each of $R^1$ and $R^2$ is a member selected from the group consisting of H, a lower alkyl group of 1 to 4 carbon atoms and phenyl, $R^3$ is a member selected from the group consisting of H and a lower alkyl group of 1 to 4 carbon atoms, A is a lower alkylene group of from 1 to 4 carbon atoms, and $n$ is 0 or 1; and the pharmaceutically acceptable acid addition salts thereof.

The benzodioxane derivatives of the present invention exhibit pharmacologic activity as vasodilators for the treatment of peripheral vascular complications.

SUMMARY OF THE INVENTION

This invention relates to novel and therapeutically valuable benzodioxane derivatives of the formula:

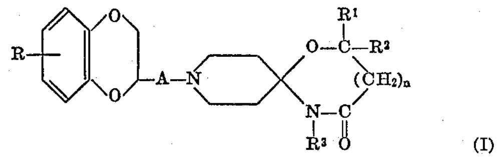

and pharmaceutically acceptable acid addition salts thereof, wherein R is H, halogen (e.g., F, Cl or Br), a lower alkyl group of 1 to 4 carbon atoms (e.g., methyl, ethyl, propyl or butyl) or a lower alkoxy group of 1 to 4 carbon atoms, A is a lower alkylene group of 1 to 4 carbon atoms (e.g., methylene, ethylene, propylene, trimethylene or tetramethylene), each of $R^1$ and $R^2$ is H, a lower alkyl group of 1 to 4 carbon atoms or phenyl, $R^3$ is H or a lower alkyl group of 1 to 4 carbon atoms, and $n$ is 0 or 1.

The compounds (I) can be produced by the following methods:

(i) By the reaction of a compound of the formula:

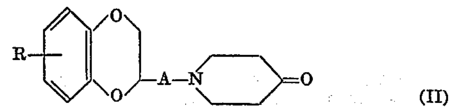

with a compound of the formula

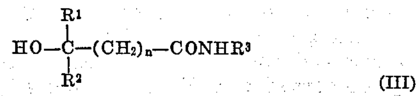

wherein R, $R^1$, $R^2$, $R^3$ and A are as defined above.

The reaction is usually carried out (a) in a solvent such as benzene, toluene, xylene or chloroform in the presence of an acid catalyst such as p-toluenesulfonic acid, benzenesulfonic acid, sulfuric acid or phosphoric acid under reflux to remove the water formed, or (b) in a solvent such as ethanol, dioxane, chloroform, tetrahydrofuran, benzene, toluene or xylene in the presence of a dehydrating agent such as calcium oxide, anhydrous magnesium sulfate, anhydrous zinc chloride, molecular sieves or N,N'-dicyclohexylcarbodiimide at room temperature or an elevated temperature.

(II) By the reaction of a compound of the formula:

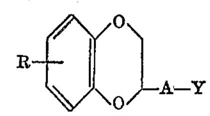

(IV)

with a compound of the formula:

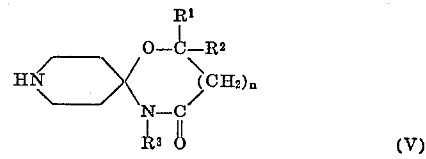

or a salt thereof such as hydrochloride or hydrobromide, wherein Y is halogen or reactive radical such as methylsulfonyloxy or p-tolylsulfonyloxy, and R, $R^1$, $R^2$, $R^3$ and A are as defined above.

The reaction is usually carried out in a solvent such as ethanol, dimethylformamide, acetone, benzene, toluene, xylene, ethyl acetate, tetrahydrofuran or dioxane in the presence of a deacidifying agent such as alkali metal carbonate, alkali metal hydrogen carbonate, alkali metal hydroxide, alkali metal alkoxide, triethylamine, diethylaniline, dimethylaniline or pyridine under reflux.

The compounds of Formula I can be converted into the corresponding acid addition salts in a conventional manner by treatment with various inorganic or organic acids, for example, hydrochloric, hydrobromic, sulfuric, nitric, oxalic, maleic, fumaric, tartaric and malonic acid.

The compounds of Formula I and pharmaceutically acceptable acid addition salts thereof, in animal tests, increase femoral blood flow as shown in the following test:

The femoral blood flow was measured by Ohashi-Yago's method (N. Yago: Foria Pharmacologica Japonica, vol. 57, page 380 (1961)) using a secobarbital anesthetized dog (male adult). The $ED_{50}$ value, the dose required to increase the femoral blood flow by 50%, each of 8-(1,4-benzodioxan-2-ylmethyl)-2-methyl-3 - oxo - 1-oxa - 4,8 - diazaspiro[4.5]decane hydrochloride and 8-(1,4-benzodioxan-2-ylmethyl)-3-oxo-1 - oxa-4,8 - diazaspiro[4.5]decane hydrochloride was 1.3 and 1.0 microgram per kilogram of body weight, respectively.

The compounds (I) and pharmaceutically acceptable acid addition salts thereof are useful, for example, as vasodilators for the treatment of peripheral vascular disturbances, and may be in the form of a pharmaceutical composition with a suitable and conventional carrier or adjuvant; administrable orally or parenterally without harm to the patients.

The pharmaceutical preparations may take any conventional form such as tablets, capsules, granules, powders, syrups or injectable solution.

Example of formulation 10 mg. tablets are prepared from the following composition:

| | Mg. |
|---|---|
| Compound (I) | 10.0 |
| Starch | 15.0 |
| Lactose | 72.5 |
| Microcrystalline cellulose | 20.0 |
| Methyl cellulose | 1.5 |
| Magnesium stearate | 1.0 |
| | 120.0 |

0.1% injectable solutions are prepared from the following composition:

| | |
|---|---|
| Compound (I) | 5 mg. (0.1%). |
| Glucose | 250 mg. (5%). |
| Water for injection | A sufficient quantity to make 5 ml. |

The daily dose of compound (I) or a salt thereof for human adults usually ranges from about 10 to 60 milligrams for oral administration and from about 5 to 10 milligrams for intramuscular administration, respectively.

A better understanding of the present invention will be attained from the following examples which are merely illustrative and not limitative of the present invention.

EXAMPLE 1

A solution of 2.5 g. of 1-(1,4-benzodioxan-2-ylmethyl)-4-oxo-piperidine, 1.1 g. of 2-hydroxypropionamide, 0.05 g. of p-toluenesulfonic acid in 150 ml. of toluene is refluxed for 10 hours in a flask provided with a water-removing apparatus. After cooling, the reaction mixture is washed with water and dried over anhydrous magnesium sulfate, and the solvent is distilled off under reduced pressure. The brown oily residue (2.8 g.) is dissolved in 10 ml. of isopropanol, 5 ml. of 30% ethanolic hydrochloric acid is added under cooling, the crystals precipitated are collected by filtration and recrystallized from ethanol to give 1.9 g. of 8-(1,4-benzodioxan-2-ylmethyl)-2-methyl-3-oxo-1-oxo-4,8-diazaspiro[4.5]decane hydrochloride as white crystals, melting at 252–254° C. with decomposition.

EXAMPLE 2

A mixture of 8.5 g. of 1-(1,4-benzodioxan-2-ylmethyl)-4-oxo-piperidine, 4.8 g. of mandelamide and 5.5 g. of dicyclohexylcarbodiimide in 300 ml. of tetrahydrofuran is heated at 40–50° C. with stirring for 3 hours. After cooling, the white crystals precipitated are filtered off, and the filtrate is concentrated under reduced pressure. The residue is dissolved in acetone and a solution of 2.5 g. of maleic acid in 50 ml. of acetone is added. The white crystals precipitated are collected by filtration and recrystallized from ethanol to give 6.5 g. of 8-(1,4-benzodioxan-2-ylmethyl)-3-oxo-2-phenyl-1-oxa-4,8-diazaspiro[4.5]decane maleate, melting at 204° C.

EXAMPLE 3

6 - methyl - 2 - p - tolylsulfonyloxymethyl-1,4-benzodioxane (11.1 g.) is added to a suspension of 8.4 g. of 2-methyl - 3 - oxo-1-oxa-4,8-diazaspiro[4.5]decane hydrobromide and 10 g. of potassium carbonate in 200 ml. of dimethylformamide, and the resulting mixture is heated at 80–90° C. for 15 hours. The insoluble matter is then filtered off, the filtrate is evaporated to dryness under reduced pressure, 100 ml. of benzene annd 70 ml. of water are added, and the benzene layer is separated, washed with 80 ml. of water, dried over magnesium sulfate and then concentrated under reduced pressure. To the red-brown solid thus obtained is added methyl ethyl ketone, and the mixture is filtered to give 2.4 g. of white crystals 8 - (6 - methyl - 1,4 - benzodioxan-2-ylmethyl)-2-methyl-3-oxo-1-oxa-4,8-diazaspiro[4,5]decane. These crystals (2.4 g.) are dissolved in 50 ml. of acetone, and a solution of 0.9 g. of maleic acid in 20 ml. of acetone is added. The white crystals precipitated are collected by filtration and recrystallized from ethanol to give 1.3 g. of 8(6-methyl-1,4-benzodioxan-2-ylmethyl) - 2 - methyl-3-oxo-1-oxa-4,8 - diazaspiro[4.5]decane maleate, melting at 209–210° C.

Using the procedures set forth in the above examples, but substituting equivalent amounts of the appropriate starting materials, the following compounds are also produced:

(1) 8-(7-chloro-1,4-benzodioxan-2-ylmethyl)-2-methyl-3-oxo-1-oxa-4,8-diazaspiro[4.5]decane oxalate melting at 216–218° C.;

(2) 8-(1,4-benzodioxan-2-ylmethyl)-2,2-dimethyl-3-oxo-1-oxa-4,8-diazaspiro[4.5]decane maleate melting at 195–196° C.;

(3) 8-(1,4-benzodioxan-2-ylmethyl)-2,4-dimethyl-3-oxo-1 - oxa - 4,8 - diazaspiro[4.5]decane melting at 108–109° C.;

(4) 8 - (1,4 - benzodioxan - 2-ylmethyl)-3-oxo-1-oxa-4,8-diazaspiro[4.5]decane hydrochloride melting at 263–265° C.;

(5) 8-(7-chloro-1,4-benzodioxan-2-ylmethyl)-3-oxo-2-phenyl-1-oxa-4,8-diazaspiro[4.5]decane maleate melting at 190–192° C.;

(6) 8-(1,4-benzodioxan-2-ylmethyl)-2,2-diphenyl-3-oxo-1-oxa-4,8-diazaspiro[4.5]decane melting at 207–208° C.;

(7) 8-(1,4-benzodioxan-2-ylmethyl)-2-methyl-3-oxo-2-phenyl-1-oxa-4,8-diazaspiro[4,5]decane melting at 171–173° C.;

(8) 9-(1,4-benzodioxan-2-ylmethyl)-4-oxo-2-phenyl-1-oxa-5,9-diazaspiro[5.5]undecane sulfate melting at 218–219° C.; and (9) 8-[5-(or 8-)methoxy-1,4-benzodioxan-2-ylmethyl]-2-methyl-3-oxo-1-oxa-4,8-diazaspiro[4.5]decane, amorphism; IR spectrum: 1700⁻cm. (—CONH—); NMR spectrum ($CDCl_3$): 1.37 p.p.m. (3H, doublet, J=7.5 Hz., $R^1$=$CH_3$), 3.85 p.p.m. (3H, singlet, $OCH_3$), 4.42 p.p.m. (1H, quartet, J=7.5 Hz., $R^2$=H), and 8.70 p.p.m. (1H, broad, $R^3$=H);

[It has not been ascertained whether the methoxy group is present at 5- or 8- position]

(10) 8-(1,4-benzodioxan-2-ylmethyl)-2,2-dimethyl-3-oxo-1-oxa-4,8-diazospiro[4.5]decane;

(11) 8-(1,4-benzodioxan-2-ylmethyl)-3-oxo-1-oxa-4,8-diazaspiro[4.5]decane; and

(12) 9-(1,4-benzodioxan-2-ylmethyl)-4-oxo-2-phenyl-1-oxa-5,9-diazospiro[5.5]undecane.

Although the present invention has been adequately discussed in the foregoing specification and examples included therein, it is readily apparent that various changes and modifications can be made without departing from the scope thereof.

What is claimed is:

1. A benzodioxane compound of the formula:

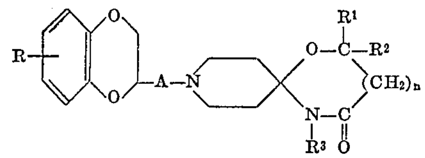

wherein R is a member selected from the group consisting of H, halogen, a lower alkyl group of 1 to 4 carbon atoms and a lower alkoxy group of 1 to 4 carbon atoms, each of $R^1$ and $R^2$ is a member selected from the group consisting of H, a lower alkyl group of 1 to 4 carbon atoms and phenyl, $R^3$ is a member selected from the group consisting of H and a lower alkyl group of 1 to 4 carbon atoms, A is a lower alkylene group of from 1 to 4 carbon atoms, and *n* is 0 or 1; and the pharmaceutically acceptable acid addition salts thereof.

2. The compound of claim 1:
8-(1,4-benzodioxan-2 - ylmethyl) - 2-methyl-3-oxo-1-oxa-4,8-diazaspiro[4.5]decane.

3. The compound of claim 1:
8-(1,4-benzodioxan-2 - ylmethyl-3 - oxo-2-phenyl-1-oxa-4,8-diazaspiro[4.5]decane.

4. The compound of claim 1:
8-(1,4-benzodioxan - 2 - ylmethyl)-2,2 - dimethyl-3-oxo-1-oxa-4,8-diazaspiro[4,5]decane.

5. The compound of claim 1:
8-(1,4-benzodioxan - 2-ylmethyl)-2,4-dimethyl-3-oxo-1-oxa-4,8-diazaspiro[4,5]decane.

6. The compound of claim 1:
8-(1,4-benzodioxan-2-ylmethyl) - 3-oxo-1-oxa-4,8-diazaspiro[4.5]decane.

7. The compound of claim 1:
8-(1,4-benzodioxan - 2-ylmethyl)-2,2-diphenyl-3-oxo-1-oxa-4,8-diazaspiro[4,5]decane.

8. The compound of claim 1:

8-(1,4-benzodioxan - 2-ylmethyl) - 2-methyl-3-oxo-2-phenyl-1-oxa-4,8-diazaspiro[4.5]decane.

9. The compound of claim 1:
9-(1,4-benzodioxan-2 - ylmethyl)-4-oxo - 2-phenyl-1-oxa-5,9-diazaspiro[4,5]undecane.

References Cited

UNITED STATES PATENTS

| | | | |
|---|---|---|---|
| 2,887,484 | 5/1959 | Funke | 260—247.7 |
| 3,399,192 | 8/1968 | Regnier et al. | 260—240 |
| 3,484,448 | 12/1969 | Krämer et al. | 260—295.5 |

HENRY R. JILES, Primary Examiner

G. T. TODD, Assistant Examiner

U.S. Cl. X.R.

260—293.58, 293.66; 424—248, 267